United States Patent [19]

Wynn et al.

[11] 4,204,792
[45] May 27, 1980

[54] BALE ALIGNMENT MECHANISM ACTUATING DEVICE

[75] Inventors: Edward J. Wynn, Leola; Cal L. Bryant, Lancaster, both of Pa.

[73] Assignee: Sperry Rand Corporation, New Holland, Pa.

[21] Appl. No.: 933,243

[22] Filed: Aug. 14, 1978

[51] Int. Cl.² ............................................. B65G 57/32
[52] U.S. Cl. ........................................ 414/36; 414/40; 414/60; 414/501
[58] Field of Search ...................... 414/36, 38, 39, 40, 414/44, 60, 501, 68; 198/418, 434; 271/233

[56] References Cited

U.S. PATENT DOCUMENTS

| 2,785,785 | 3/1957 | Macaluso | 198/466 |
| 3,289,859 | 12/1966 | Tarbox | 414/40 |
| 3,330,424 | 7/1967 | Grey et al. | 414/39 |
| 3,481,497 | 12/1969 | Butler | 414/39 |
| 3,549,023 | 12/1970 | Backman | 414/40 |
| 3,724,684 | 4/1973 | Butler et al. | 414/40 |
| 3,862,692 | 1/1975 | Butler | 414/39 |
| 3,901,393 | 8/1975 | Butler et al. | 414/40 |
| 3,920,133 | 11/1975 | Butler et al. | 414/39 |
| 4,022,333 | 5/1977 | Haugen | 414/60 |
| 4,088,231 | 5/1978 | Zipser | 414/38 |

Primary Examiner—L. J. Paperner
Attorney, Agent, or Firm—Shlesinger, Arkwright, Garvey and Dinsmore

[57] ABSTRACT

A bale row forming table of a three table type bale wagon has an actuating lever which cooperates in detecting the length of a bale row and in repositioning the last bale of the row when a short row is detected. The actuating lever manipulates an electrical sensor in response to the presence or absence of a bale in contact therewith and is oriented so as to be displaced in only one direction regardless of whether it is contacted by a bale from above or from the side.

11 Claims, 16 Drawing Figures

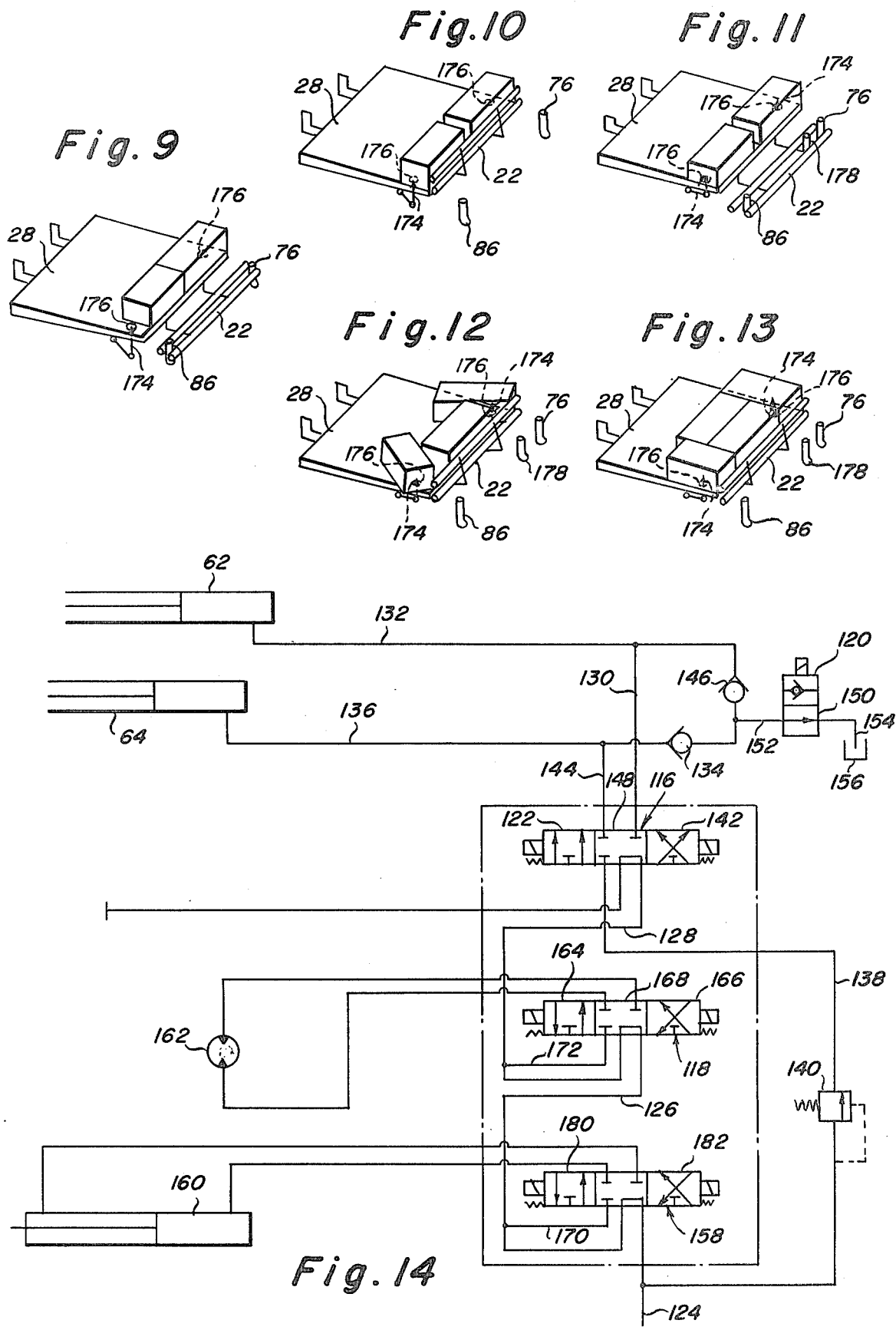

BALE ALIGNMENT MECHANISM ACTUATING DEVICE

CROSS REFERENCES TO RELATED APPLICATIONS

Reference is hereby made to the following copending U.S. applications dealing with related subjectmatter and assigned to the assignee of the present invention:
1. "Bale Alignment Device" by Lester C. Barton, Gene R. Butler and L. Dennis Butler, Ser. No. 933,242, filed Aug. 14, 1978.
2. "Automatic Bale Wagon Control System" by Edward J. Wynn and Cal L. Bryant, Ser. No. 933,233, filed Aug. 24, 1978.

BACKGROUND OF THE INVENTION

The present invention relates to a bale wagon alignment mechanism and an actuating device for use therewith.

Over the past years, the three-table bale wagon, such as that disclosed in U.S. Pat. No. 2,848,127 to G. E. Grey, an improved version of which is disclosed in U.S. Pat. No. 3,945,507 to J. A. Olsen and L. D. Butler, has become by far the most successful commercial bale wagon. The Grey bale wagon includes three tandemly arranged tables, each pivotally mounted about a transverse axis relative to the longitudinal center line of the wagon. Bales of hay are picked up from the field and conveyed onto a first table. The bales are conveyed across the first table by means of a cross conveyor thereby being arranged end to end in a row. The first table then pivots upwardly about its transverse axis to deposit the bale rows on a rearwardly disposed second table. The first table continues to receive bales and to deposit the bales received on the second table until a tier of bales has been accumulated on the second table. Once a full tier of bales consisting of a plurality of rows has been accumulated on the second table, the second table is pivoted upwardly about its transverse axis, causing the tier of bales to be deposited on a rearwardly disposed third table or load bed. The second table continues to function as a receiving means on which tiers are formed and continues to deposit the tiers formed thereon in succession on the third table until a stack of bales is formed thereon, the stack being comprised, of course, of a series of side by side tiers. Once the stack has been formed on the third table, the bale wagon can then deposit the entire stack on the ground or on some other storage surface by pivoting the third table about a transverse axis, allowing the stack to be disposed in a generally upright manner on the ground or in a storage area.

Stacking is a very important function of a bale wagon. To a significant degree, the overall performance of a bale wagon and specifically the quality of the stack and its ability to stand over long periods of time and to be retrieved readily depend on the bales being of uniform shape and having relatively constant dimensions. In this regard, the three table Grey type bale wagon includes a transfer mechanism actuating trip lever adjacent one end of the first table opposite the pick-up. The purpose of the trip lever is to actuate the first table when the outermost end of the first bale received engages the trip lever, causing the first table to pivot upwardly transferring the bales thereon to the front portion of the second table. Because of this, all of the bales along the trip side of the bale wagon are in very good alignment. But should the bale wagon pick up some short bales of less length than the standard length, and these bales are placed on the first table as far toward the first table trip arm as possible, it follows that the first table cycles without regard to the alignment of the bales on the loading side of the bale wagon. The net result is that the side of the stack opposite the trip arm side becomes very jagged and is not properly aligned.

Short bales pose an additional problem with regard to the tier forming capability of the second table. In order to enhance the stability of the stack, it is generally desirable to provide one or more tie tiers within the stack, such being tiers having individual bales arranged to overlap two bales in adjacent tiers above and below the tie tier, an effect achieved by rotating selected bales 90° after they are loaded on the second table. The rotation is achieved by engaging bales disposed along the forward end of the second table with spikes towards their outside ends thus pinning each bale toward one end while subsequent bales are added toward the center of the second table. The unpinned ends of the bales are forced backward along the table while the bales rotate about their respective spikes. This operation would be handicapped by short bales which, being placed on the first table as far toward the trip side as possible, could result in the bale on the loading side missing the tie forming spike after being transferred to the second table.

It will be appreciated that as long as all of the bales are of constant length these problems do not present themselves.

The aforementioned application of L. C. Barton, G. R. Butler and L. D. Butler entitled "Bale Alignment Device", the disclosure of which is herein incorporated by reference, provides a solution to the problem through the use of a bale receiving end trip lever which cooperates with the transfer mechanism trip lever and the first table conveyor to position bales along the table in such a way as to insure formation of bale rows of uniform overall length regardless of the lengths of the bales contained therein. The bale receiving end trip lever acts to sense the location of the last bale received on the first table when the first bale on the table trips the transfer mechanism lever and the last bale is repositioned, if necessary, to correctly align its outside edge with those of the other bales on the bale receiving side of the bale wagon.

SUMMARY OF THE INVENTION

An object of this invention is to provide a bale alignment mechanism actuating device having an improved bale receiving end trip lever.

An object of this invention is to provide a bale alignment mechanism actuating device which is more sensitive to minor variations in bale length and thus will result in better alignment of bales.

An object of the invention is to provide a bale alignment mechanism actuating device having a bale receiving end trip lever which pivots downward away from the end of the table remote from the bale receiving end, not towards it, regardless of whether a bale contacting the lever contacts it from above when being loaded on the table or from the side when being moved back along the table.

Another object of the invention is to provide a bale alignment mechanism actuating device having a bale receiving end trip lever which operates with an electrical sensor which may be mechanically, electrically or magnetically operated.

A further object of the invention is to provide a bale alignment mechanism actuating device having a bale receiving end trip lever which may cooperate with an automatic electrical control system for the overall operation of the bale wagon.

These objects are achieved by an actuating device for the bale alignment mechanism of a bale wagon table having a lever positioned at the bale receiving end of the table with a portion lying in the path of any bales on the table and having means associated therewith permitting the lever to be displaced from a rest position when contacted by a bale and returning the lever to the rest position when the bale is removed. The device also has an electrical sensor having a first position and a second position and a sensor actuating means for placing the sensor in the first position when the lever is displaced from the rest position and for placing the sensor in the second position when the lever is in the rest position. One of the sensor actuating means and the sensor is mounted in a fixed location adjacent the lever while the other is attached to the lever. An electrical system interconnects the sensor with the table transfer mechanism for permitting operation of the transfer mechanism when the sensor is in the first position and for preventing operation of the transfer mechanism and reversing the table conveyor when the sensor is in the second position. The electrical sensor may be a Hall effect switch in which case the means for placing the switch in the first and second positions is a magnet. The lever is so positioned at the bale receiving end of the table that the lever will be displaced in an arcuate path downward and longitudinally along the table away from the end of the table remote from the bale receiving end and therefore place the sensor in its first position regardless of whether the lever is displaced from above by a bale being loaded onto the table or from the side by a bale being conveyed back along the table.

BRIEF DESCRIPTION OF THE DRAWINGS

FIG. 9 is a diagrammatic view of the first and second tables of a bale wagon with two bales on the second table loaded thereon without the use of a bale alignment mechanism;

FIGS. 10, 11, 12 and 13 are diagrammatic views of the initial steps in the formation of bales into a tie tier;

FIG. 14 is a diagrammatic representation of the hydraulic system used for operation of the first table;

DETAILED DESCRIPTION OF THE INVENTION

In the following description, right hand and left hand references are determined by standing at the rear of the machine and looking forward.

Figure 1:
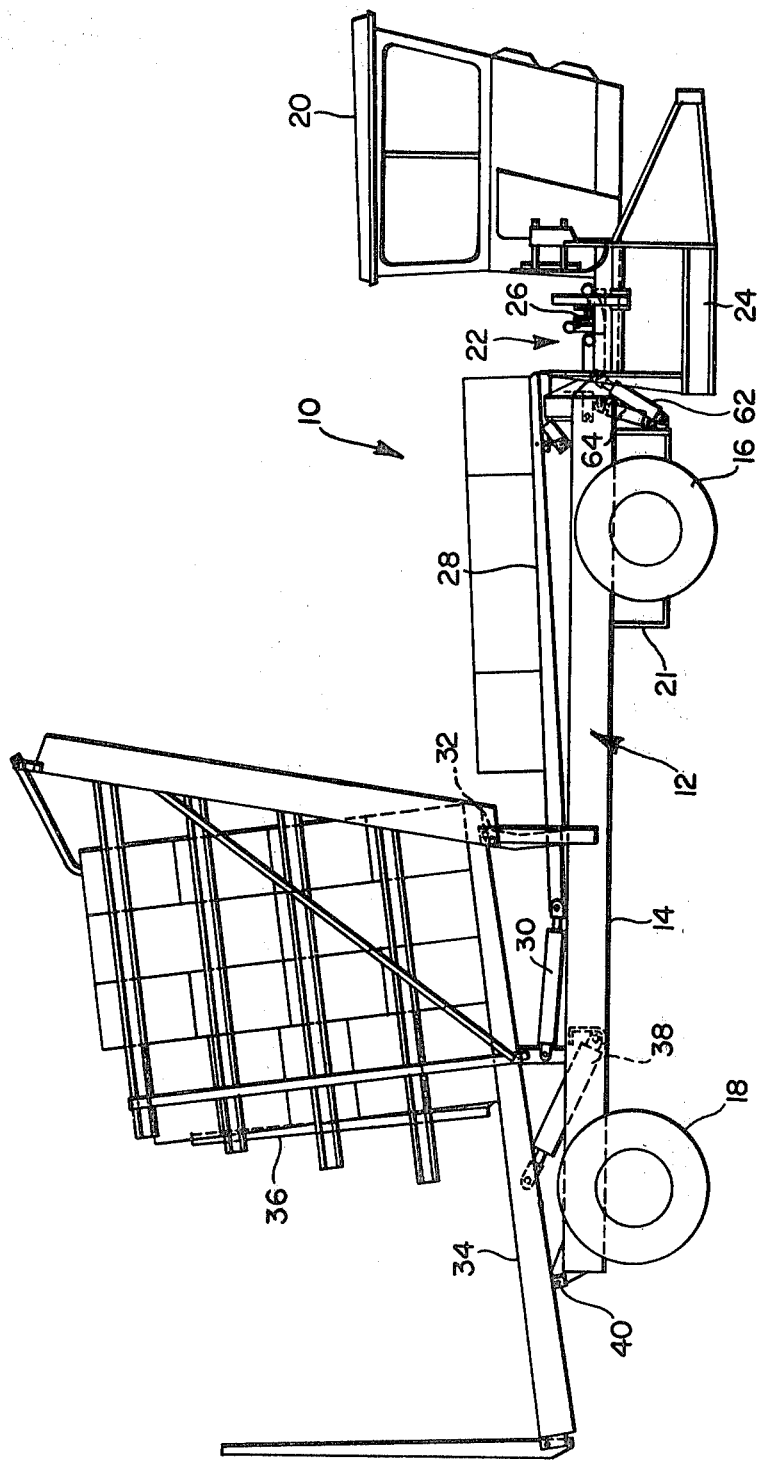
FIG. 1 is a side elevational view of a bale wagon having the present invention, showing the bale wagon with a partially formed block-type stack of bales on its third table and during formation of a tier of bales on its second table.

FIG. 1 shows a bale wagon 10 of the three table type the various elements and the functioning of which are more fully discussed in U.S. Pat No. 3,945,507, the disclosure of which is herein incorporated by reference. The bale wagon 10 is provided with a mobile chassis, indicated generally at 12, formed of left and right longitudinally extending channels 14, suitably interconnected by spaced transverse channels (not shown), and front and rear wheels 16, 18 for movably supporting the interconnected channels 14. On the forward ends of the channels 14 a cab 20 is mounted for housing the operator and various controls for the wagon. A source of power, such as an engine (not shown) is suitably mounted on the chassis 12 within a support structure 21 fixed between channels 14 for driving, preferably, the rear pair of wheels 18. Although the wagon illustrated is a selfpropelled type, it could readily take the form of a pulltype wagon with the forwad ends of the channels 14, instead of mounting the cab 20, converging in an assembly which would adapt the wagon to be secured to a tractor, or other towing vehicle, located at the front of the wagon.

Mounted near the forward end of the mobile chassis 12, immediately behind the cab 20, and extending transversely thereto, is the first, bale-receiving or bale row forming table 22 of the wagon 10. The bales are first introduced to the first table 22 by means of a bale loader or pick-up, generally indicated at 24, which is mounted to the chassis 12 at the right hand of the table 22 and operates to lift bales from the ground and direct them through a generally 90° arcuate lateral path to the right receiving or loading end of the table 22. A cross conveyor 26 is operatively mounted to the chassis 12 and longitudinally extends along the first table 22 from approximately the receiving end to near the middle thereof for moving the bales longitudinally along the table 22 from the loader 24 toward the left end of the first table 22. The first table 22 thus functions to form a row of bales thereon end to end in an abutting relationship. While this description is generally directed to a two bale row, the bale wagon 10 may be adapted for use with bale rows of different numbers.

Positioned along and generally above the rear longitudinal side of the first table 22 is the second or tierforming table 28 of the bale wagon 10 which receives bales from the first table 22 and accumulates them forming them into a bale tier. The second table 28 is shown in its normal horizontal tier-forming position. When the requisite number of bales have been accumulated and formed on the second table 28 in a suitable manner into either a standard tier pattern, or one of several tie tier patterns, a hydraulic cylinder 30 is actuated so as to extend and cause the table 28 to swing or pivot upwardly generally 90° about a pivot point 32 to a generally vertical position adjacent the front end of the third table or load bed 34 upon which the bale tiers are accumulated into a bale stack. A stack of bales is progressively formed on the third table 34 upon successive delivery thereto of tiers of bales by pivotal movement of the second table 28 from its normal horizontal tier-forming position to its generally upright position adjacent the forward end of the third table 34. As the first tier of bales is delivered or deposited into the third table 34, a rolling rack 36, longitudinally moveable rearward along the third table 34 by the load being formed and forward by a hydraulic cylinder (not shown), is contacted by the tier and forced to move rearwardly along the third table 34 against the residual holding pressure of the hydraulic cylinder.

When the third table 34 has been loaded with the desired number of tiers, the stack can be transferred to the ground in the form of a composite stack by extension of the hydraulic cylinder 38 which causes the third table 34 to pivot generally 90° about point 40 from the generally horizontal position of FIG. 1 to an upright position in which the rolling rack 36 and the rear end of the third table 34 are disposed adjacent the ground.

Figure 2:
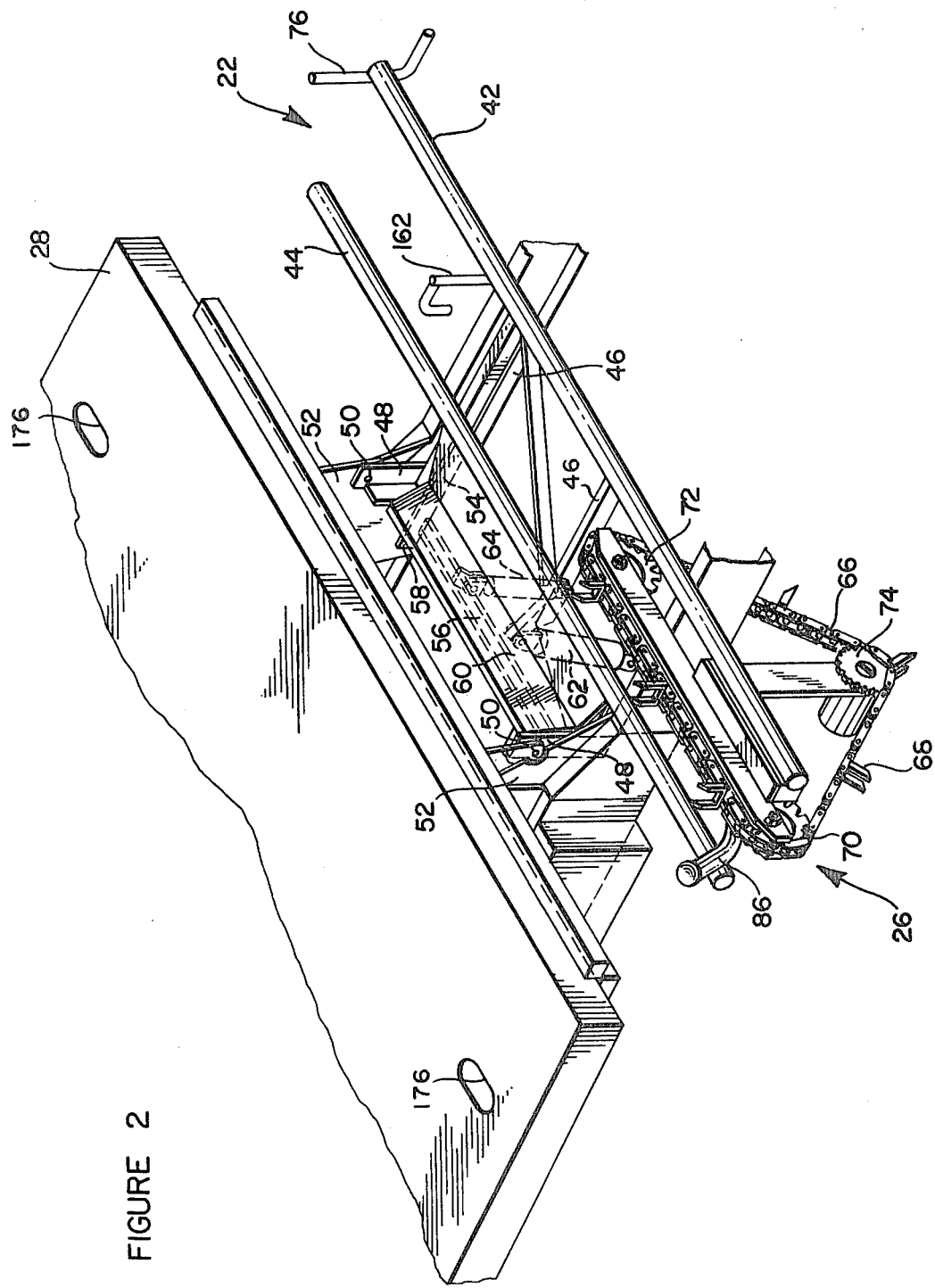
FIG. 2 is an enlarged fragmentary perspective view of the first table of the bale wagon of FIG. 1 having the actuating device of the present invention.

The first table 22 of the bale wagon 10 is illustrated in greater detail in FIG. 2 and comprises two parallel transversely-extending and spaced-apart front and rear beams 42, 44. Front beam 42 is mounted on forwardly extending horizontal members 46 of an L-shaped structure which also includes rear upwardly extending leg portions 48 which are pivotally secured at 50 to brackets 52 mounted on the longitudinal channels 14. The front transverse beam 42 supports the bales received on the first table 22 on one side of each bale at a location remote from the second table 28. The rear transverse beam 44 supports the bales received on the first table 22 at a location near the second table 28. Rear transverse beam 44 is mounted on the forward ends of a pair of spaced apart arms 54 which are interconnected by a brace 56. The rear ends of the arms 54 are pivotally secured at 58 between the upstanding brackets 52 generally below, inwardly from, and rearwardly of, the pivotal securement of upwardly extending leg portions 48 at 50 to the brackets 52. A shield piece 60 is fixed across the arm 54 rearwardly of the beam 44 for helping to prevent the flow of crop material from the bales received on the first table 22 to under the front end of the second table 28 where the engine for the bale wagon 10 is located on support structure 21.

First and second hydraulic cylinders 62, 64 are pivotally secured at their anchor ends to the forward side of the engine support structure 21 and are pivotally secured at their rod ends to the horizontal members 46 connected to front beam 42 and to the brace 56 connected to the rear beam 44 respectively. Bales are transferred from the first table 22 to the second table 28 by activating the first hydraulic cylinder 62 which extends and swings or pivots the front beam 42 upwardly about its pivotal point 50 in a counter-clockwise direction to a generally vertical, bale-discharging position adjacent the second table 28. The second beam 44, due to the overlapping relationship of the beam 44 and the forwardly extending horizontal members 46, will be carried to its upper position by the movement of horizontal members 46 caused by hydraulic cylinder 62. The second beam 44 operates independently by means of its hydraulic cylinder 64 in a special mode for changing the side upon which a bale will be deposited on the second table 28. This special mode action of the first table 22 does not form a part of the present invention and is completely discussed in the aforementioned U.S. Pat. No. 3,945,507.

Positioned between the front and rear beams 42, 44 toward the bale receiving end of table 22 is a conveyor 26 situated parallel to the front and rear beams 42, 44 for the purpose of conveying bales longitudinally on the table 22. The conveyor 26 comprises a chain 66 having bale-engaging teeth 68 located at intervals thereon. The chain 66 travels in a continuous path about sprocket wheels 70, 72, 74. The conveyor 26 extends from approximately the right receiving end of the table 22 to near the middle thereof. A bale lifted from the ground and directed through a generally 90° arcuate lateral path by the bale loader 24 is dropped onto the first table 22 at the bale receiving end thereof where it is engaged by the teeth 68 of the conveyor 26. The bale is moved along the table 22 by the conveyor 26 until past the point where it can no longer be engaged by the teeth 68. The next bale on the table 22 is similarly engaged by the conveyor 26 and moved longitudinally along the table 22. Upon contact with the first bale the second bale still engaged by the conveyor 26 will push the first bale farther toward the end of the first table 22 remote from the bale receiving end. Positioned at the end of the table 22 remote from the bale receiving end is a trip lever 76 which lies in the bale path. When the first bale reaches a predetermined point set by adjusting the longitudinal position of the trip lever 76 the bale will engage the trip lever 76 thus activating the transfer mechanism of the first table 22 to pivot the first table 22 upward and deposit the two bales on the forward portion of the second table 28.

Figure 3:
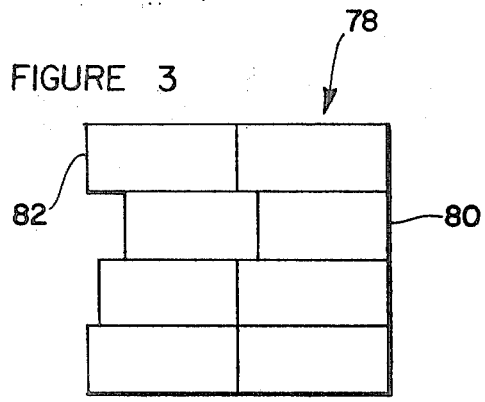
FIGS. 3 and 4 are diagrammatic views of bale tiers containing short bales.

The transfer mechanism actuating trip lever 76 is set at a predetermined longitudinal point along the first table 22 based on the normal length of the bales to be loaded and no problems are encountered as long as the bales are in fact of the normal length. However short bales can be encountered which, due to the manner in which the first table conveyor 26 operates so as to position bales end to end in abutting relationship as far as possible toward the end of the first table 22 remote from the bale receiving end, will result in a bale stack 78 as depicted in FIG. 3. The bale stack 78 has one side 80 in alignment due to the fact that the first bale of each row on table 22 is at the same position when the trip lever 76 is engaged. However the opposite side 82 of the bale stack 78 is out of alignment due to the action of the conveyor 26 which regardless of the length of the bales moves them as far as possible away from the bale receiving end of the table 22 thus resulting in an unsightly and unstable bale stack.

Figure 4:
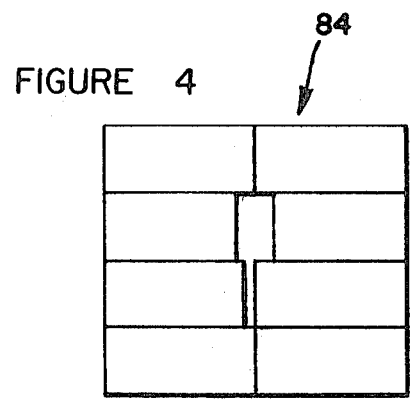
Figure 5:
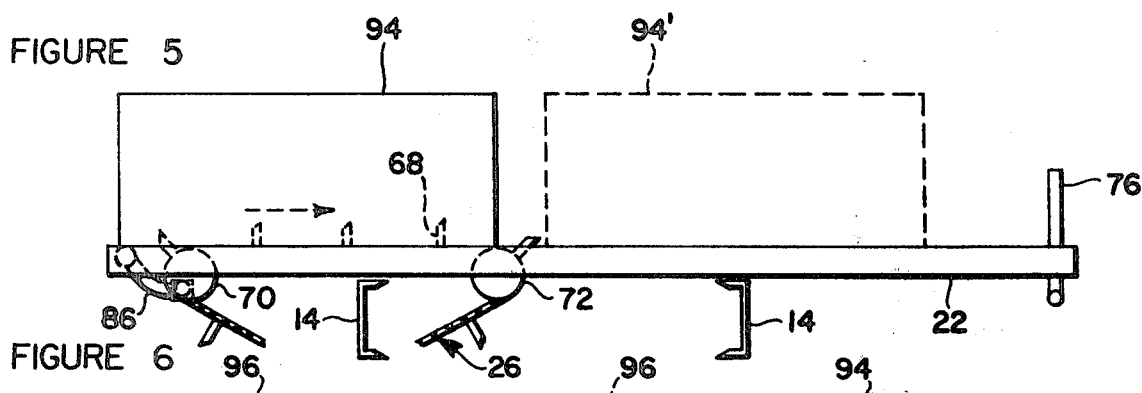
FIGS. 5, 6, 7 and 8 are diagrammatic views of a bale wagon first table with the actuating device of the present invention showing the table in successive stages of operation.
Figure 15:
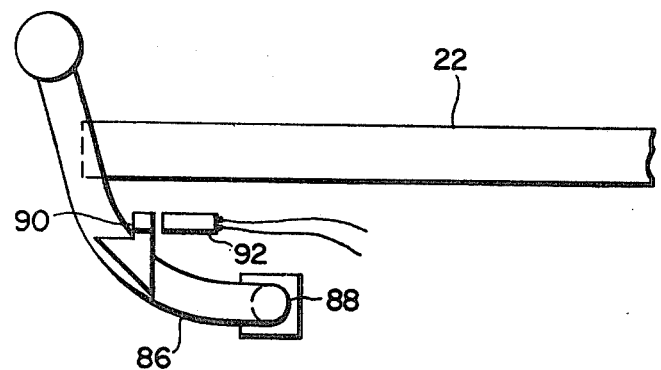
FIG. 15 is a diagrammatic view of the actuating device of the present invention.

To avoid the situation so as to produce a more stable bale stack 84 as shown in FIG. 4 having all sides in alignment, a second trip lever 86, which functions as the bale alignment mechanism actuating lever, is positioned at or or adjacent the bale receiving end of the table 22. The lever 86, shown in FIG. 15, is pivotally mounted at 88 to a support situated below the plane of table 22 with its upper portion projecting above the plane of the table 22 so as to lie in the path of any bales on the table 22. The lever 86 pivots in an arcuate path generally parallel to the longitudinal direction of the table 22 which is also the direction of travel of the conveyor 26. The plane in which the lever 86 pivots is substantially perpendicular to the plane of the table 22. The lever 86 is an elongated member curved in the plane substantially perpendicular to the plane of the table 22 and has its concave side facing toward the table 22. When in its rest position, as shown in FIG. 15, the lever 86 is oriented at an angle with respect to the vertical and inclined toward the bale loader 24 and away from the end of the table 22 remote from the bale receiving end. In this orientation the lever 86 passes through the plane of the table 22 at a point longitudinally spaced from a point on the plane of the table 22 situated directly above the pivot mount 88. The point at which the lever 86 passes through the plane of the table 22 is also closer to the bale loader 24 than the point on the table directly above the pivot mount 88.

The pivoting mechanism which supports the lever 86 is such that, when the lever 86 is not in contact with a bale and is, therefore, in its rest position, the lever 86 is at one end of its path of travel. If contacted by a bale, the lever 86 is displaced and pivots down and toward the bale loader 24, which is in the longitudinal direction away from the end of the table 22 remote from the bale receiving end, and the upper portion of the lever 86, which lies in the path of the bale, moves to a position approximately within the plane of the table 22. The lever 86 thus assumes a displaced position and has a mechanism associated therewith which returns the lever 86 to its rest position when the bale is removed.

The lever 86 is oriented in this manner so that it will be displaced through this same path down and toward the bale loader 24 regardless of the direction in which the lever 86 is contacted by a bale whether that direction be from above as a bale is dropped onto the table 22 by the bale loader 24 or from the concave side as a bale is conveyed back along the table 22 as will be shortly discussed.

Positioned on the lever 86 is a magnet 90 which, when the lever 86 is in its rest position, is directly adjacent a Hall effect sensor (a sensor responsive to changing magnetic field) 92 having a first position and a second position between which the sensor 92 is tripped back and forth by the magnet 90. The sensor 92 has a fixed location. Thus the sensor 92 is placed in its first position when the magnet 90 is removed from the sensor 92 through the action of the lever 86 being displaced by the presence of a bale. When the bale is removed, the lever 86 returns to its rest position and the magnet 90 is once again adjacent the sensor 92 which places the sensor 92 in its second position. As the lever 86 moves through the same path regardless of the direction in which it is contacted so to does the magnet 90 travel the same path regardless of the direction of contact.

While a Hall effect sensor is used in the preferred form of this invention, other types of electrical sensors may be used such as a reed switch, proximity switch or a push button switch in which case the means for placing the sensor in its various positions would be whatever is appropriate for the sensor being used rather than a magnet. Also, the sensor 92 is in a fixed position while the actuating magnet 90 moves in this embodiment but their positions can be reversed. All that is critical is that there be relative movement of one with respect to the other.

The sensor 92 is electrically interconnected with the table transfer mechanism and with the transfer mechanism actuating trip lever 76. It acts to permit operation of the table transfer mechanism when it is in its first position due to the magnet 90 and the lever 86 being displaced and acts to prevent operation of the table transfer mechanism and to reverse the conveyer 26 when it is in its second position due to the magnet 90 being adjacent with the lever 86 in its rest position.

Figure 6:
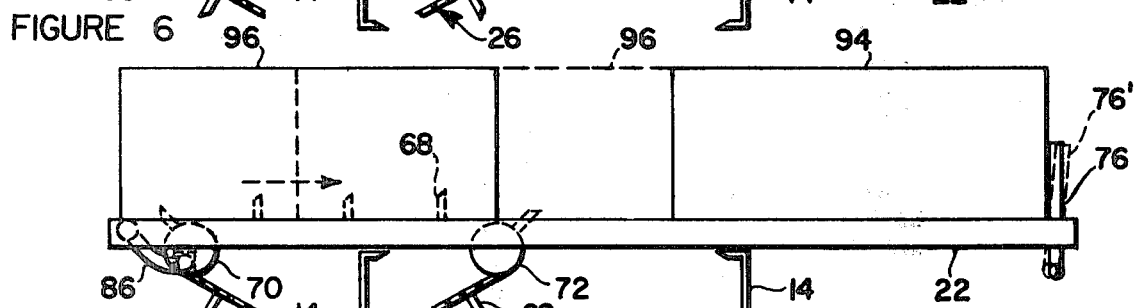
Figure 7:
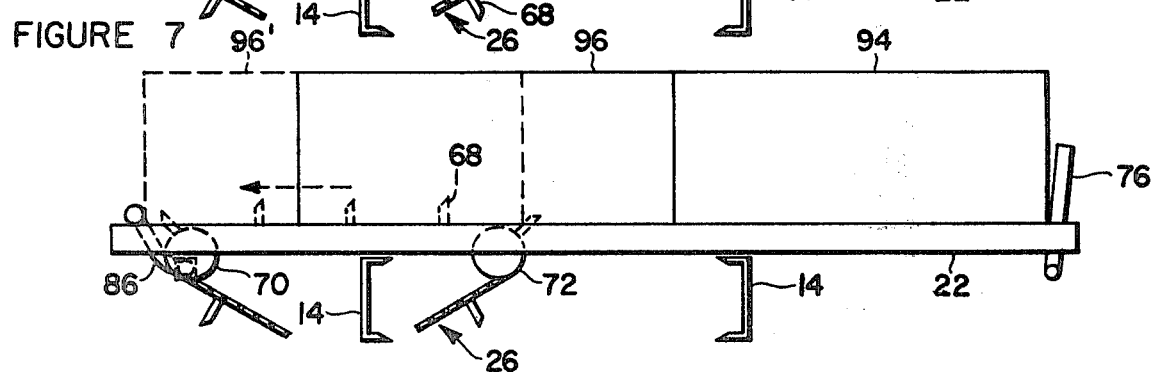
Figure 8:
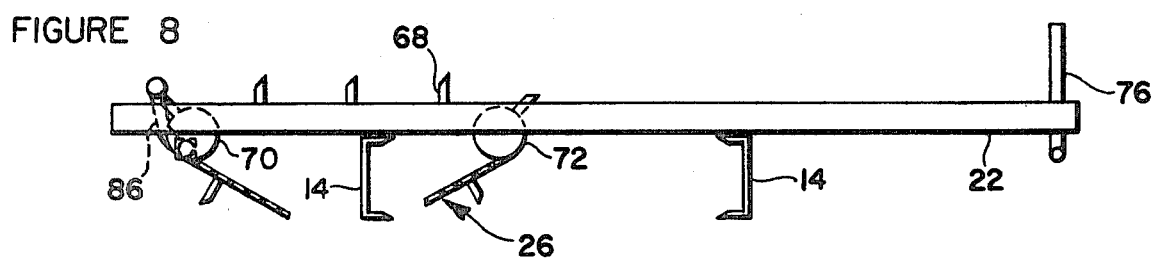

With reference to FIGS. 5–8, two short bales 94, 96 are loaded on the first table 22. The first short bale 94 is loaded on the bale receiving end of the table 22 and is conveyed by the conveyor 26 toward the end of the table 22 remote from the bale receiving end until out of engagement with the teeth 68. When at the bale receiving end of the table 22 the bale 94 displaces the lever 86 away from the end of the table 22 remote from the bale receiving end but upon movement along the table 22 the bale 94 moves out of contact with the lever 86 which thereupon returns to its rest position. The second and, in the case of a two bale row, last bale 96 to be loaded on the table 22 also displaces the lever 86 at first. As shown in FIG. 6, the bale 96 is moved by the conveyor 26 toward the end of the table 22 remote from the bale receiving end and in doing so contacts the end of the bale 94 so that both bales are moved toward the trip lever 76. After the bale 96 has moved a certain distance the lever 86 returns to its rest position.

If both bales loaded on the table 22 had been of normal length, the second bale on the table would still be holding the lever 86 in a position displaced downward and longitudinally away from the end of the table remote from the bale receiving end when the leading edge of the first bale tripped the lever 76. Since the lever 86 would remain displaced at this time, the transfer mechanism of the table 22 would be activated and would transfer the two bales to the forward portion of the table 28.

However, if, as in the present case, either one or both of the bales loaded on the table 22 are shorter than normal, the last bale 96 on the table 22 will move longitudinally along the table 22 past a point where the lever 86 will remain displaced whereupon it will return to its rest position. Thus when the leading edge of the bale 94 which is being moved along the table 22 by the bale 96 reaches the point where it trips the lever 76, the lever 86 will be in its reset position. As a result the transfer mechanism of the table 22 will not be activated and the conveyor 26 will be reversed whereupon the vale 96 will be moved back toward the bale receiving end of the table 22 while the bale 94 which is no longer engaged by the conveyor 26 will remain in position on table 22 against the trip lever 76. The bale 96 will continue back along the table 22 until it engages and displaces the lever 86 toward the bale loader 24. Once the bale 96 reaches this predetermined point adjacent the bale receiving end of the table 22 set by the longitudinal position of the lever 86 the transfer mechanism of the first table is activated since both the levers 76 and 86 are in their displaced positions. The bales 94, 96 therefore are transferred to the second table 28 of the bale wagon 10 with their respective outside edges in alignment with the outside edges of bale rows having bales of normal length. Thus the levers 76 and 86 and their interaction with the transfer mechanism and the conveyor 26 of the table 22 cooperate to sense the actual length of a bale row and reposition the bales of any row found to be shorter than normal. The longitudinal position of the lever 86 along the table 22 may be adjusted according to the normal size of the bales to be loaded.

The particular orientation of the lever 86 inclined toward the bale loader 24 when in its rest position and the displacement mechanism of the lever 86 which directs the displacement of the lever 86 always down and toward the bale loader 24 and away from the opposite end of the table 22, which is the end remote from the bale receiving end, permits greater sensitivity to minor variations in bale length. If the lever 86 could pivot in either longitudinal direction of the table 22 and was oriented to be displaced away from the bale loader 24 when a bale lands on table 22 from the bale loader 24 then a short bale must travel a small distance toward the end of the table 22 remote from the bale receiving end before the lever 86 would be freed and could return to reverse the conveyor 26 when the lever 76 is tripped. If one or more bales in the bale row was only slightly short, the last bale on the table 22 would travel only a slight distance before the first bale would trip the lever 76. If this slight distance was less than the small distance needed to free the lever 86, the lever 86 would not be freed and the table transfer mechanism would be activated without the last bale being in a proper position. With the one direction only trip lever 86 of the present structure in which the lever 86 travels toward the end of the table 22 remote from the bale receiving end along with the bale, any longitudinal movement of a bale away from the bale receiving end of the table 22 will permit the lever 86 to move its rest position.

Figure 16:
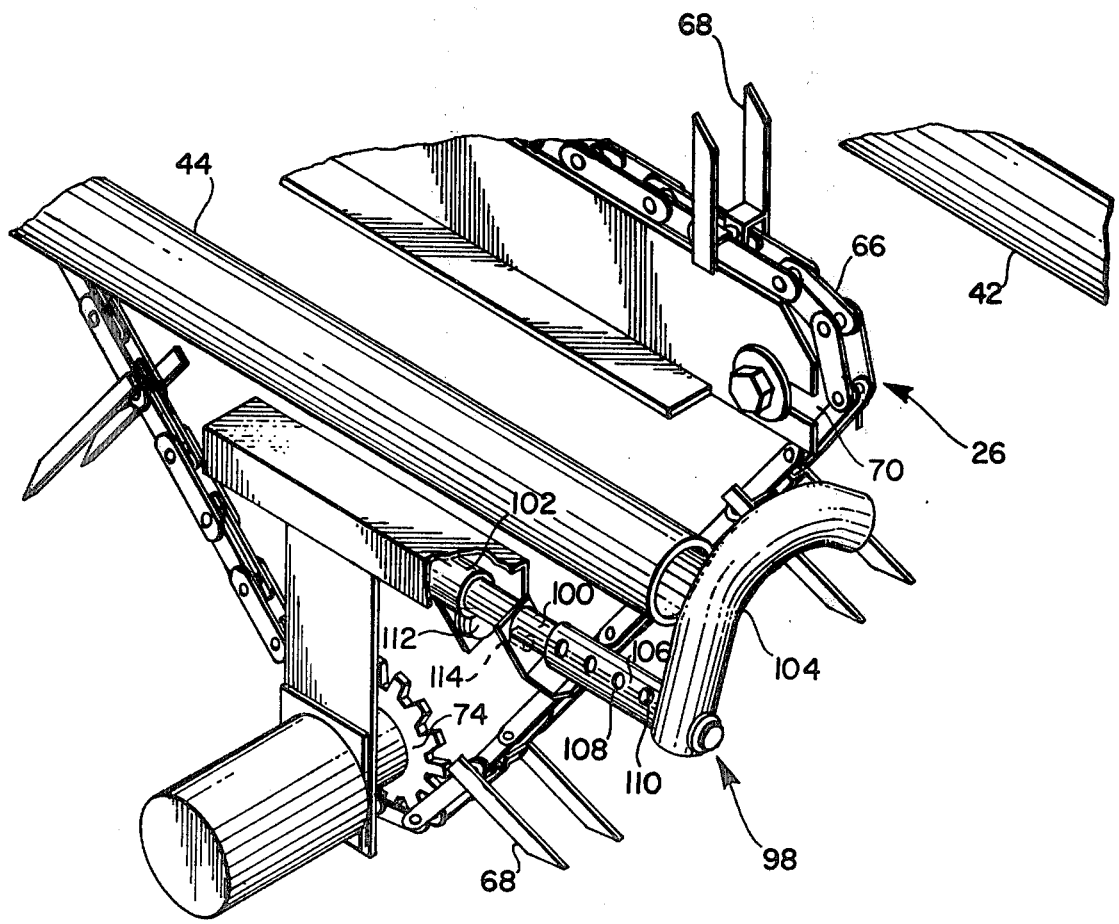
FIG. 16 is an enlarged fragmentary perspective view of the bale receiving end of the first table having a modified form of the actuating device.

Referring to FIG. 16, an alternative structure for the actuating lever of the bale alignment mechanism or bale receiving end trip lever is shown. This alternative trip lever 98 is mounted behind the rear first table beam 44 and has a longitudinally extending (relative to the first table 22) shaft 100 which is inserted in a cylindrical longitudinally extending mounting sleeve 102 within which the longitudinal shaft 100 is rotatable and axially slidable. Attached to the shaft 100 is a transversely extending (relative to the table 22) arm 104 which is mounted on the shaft 100 with a sleeve 106 having a series of openings 108 therein which correspond to a series of openings in the longitudinal shaft 100. These openings are used to vary the longitudinal position of the transverse arm 104, which is locked in position with a bolt 110 so as to set the bale alignment mechanism for bales of different average length.

Fixed in one location on the sleeve 102 is a Hall effect sensor 112 which is placed in one position or the other by the action of the magnet 114 which is fixed in position on longitudinal shaft 100 by a bracket. The magnet 114 may be removed from its location adjacent the switch 112 by rotation of the shaft 100 or by longitudinal extension thereof.

The shaft 100 and its mounting sleeve 102 have associated therewith a displacement and returning mechanism which will return the trip lever 98 to a rest position in which the magnet 114 is adjacent the switch 112 whenever the lever 98 is not contacted by a bale. In the rest position the shaft 100 is not extended and is in such a rotated position that the magnet 114 directly faces the switch 112. Also in the rest position the arm 104 extends above the plane of the table 22 and lies in the path of any bales placed on the table 22. The lever 98 is not shown in its rest position in FIG. 16 but for clarity has been shown with the shaft 100 longitudinally extended. The arm 104 is at all times longitudinally placed so as to avoid interfering with the rear table beam 44 when the table 22 transfers bales to the second table 28 and the beam 44 pivots upward.

In operation, a bale being loaded on the table 22 depresses the arm 104 and separates the magnet 114 and sensor 112 so that the table transfer mechanism may function when the lever 76 is tripped. If, however, a short bale is encountered, the arm 104 will instantly rotate back placing the magnet 114 adjacent to the sensor 112. With the conveyor 26 reversed, the returning last bale will engage the transverse arm 104 from the side which will cause longitudinal movement of the shaft 100 and separation of the magnet 114 and the sensor 112 thus activating the table transfer mechanism.

Thus the lever 98 is very responsive to the longitudinal position of the last bale on the table 22 with the transverse arm 104 requiring no extra movement of the bale toward the end of the table 22 remote from the bale receiving end before springing back to its rest position because the transverse arm 104 travels in a transverse plane rather than a longitudinal one.

The transverse arm 104 in its extended position also provides a positive stop in that bales cannot slide past it when the bale wagon 10 is operating on a hillside or making a turn.

Referring to FIG. 14 there is shown the hydraulic system interconnecting the transfer mechanism of table 22 with the transfer mechanism activating trip lever 76, the bale receiving end trip lever 86 and the conveyor 26. The hydraulic system includes a first table transfer solenoid valve 116, a conveyor direction solenoid valve 118 and a first table dump solenoid valve 120. When the spool of valve 116 is in position 122 hydraulic fluid under pressure from a pump (not shown) via lines 124, 126, 128 passes through the valve 116 to lines 130 and 132 where it enters cylinder 62. At the same time the first table dump valve 120 shifts to its closed position while the presence of check valve 134 prevents fluid from flowing into line 136 and cylinder 64. A flow line 138 is provided interconnecting flow line 124 with one path in each of the two pairs of flow paths through the valve 116. A sequence valve 140 is connected in the line 138 which will normally prevent the flow of fluid from line 124 to enter line 138 to the valve 116 until a predetermined level of line pressure is reached. Such a level is above the level of pressure needed to extend the second hydraulic cylinder 64. Thus, when the first table transfer valve 116 is at position 142 for operation of the second beam 44 of the first table 22 independently in its special mode, the flow of fluid initially proceeds through valve 116 to the second cylinder 64 via lines 144 and 136 to cause extension thereof. Check valve 146 prevents fluid from flowing into line 132 and cylinder 62. Once the cylinder 64 has fully extended, a level of pressure is almost instantaneously reached which overcomes the spring bias of sequence valve 140, whereby the flow of fluid proceeds in line 138 through valve 116 to the first cylinder 62 via lines 130 and 132 to cause extension thereof. When the cylinder 62 has fully extended with the first table 22 pivoted to its upper vertical position, a suitable electrical connection releases the spools of solenoid valves 116 and 120 to their non-energized positions 148 and 150, allowing the transfer mechanism to return to its lower position with release of the hydraulic pressure via lines 152 and 154 to the tank 156. If the first table transfer valve 116 had been at position 122 for operation of first table 22 in its normal mode, the flow of fluid would have proceeded from line 128 through valve 116 to cylinder 62 via lines 130 and 132 to cause extension thereof. Once the cylinder 62 had fully extended, the same aforementioned electrical connection would release the spools of the valves 116 and 120 to their non-energized positions 148 and 150. The two mode operation of the first table 22 is more fully discussed in the aforementioned U.S. Pat. No. 3,945,507.

Also shown in FIG. 14 are a hydraulic solenoid valve 158 and a hydraulic cylinder 160 which form components of the tie spike mechanism of the bale wagon which is used in the formation of tie tiers. This mechanism and the tie tiers it is used to form are discussed here with regard to their pertinency to the present invention. A fuller discussion thereof can be found in the aforementioned U.S. Pat. No. 3,945,507.

The hydraulic fluid under pressure from line 124 is fed via line 126 to the conveyor direction hydraulic solenoid valve 118 and from there to conveyor hydraulic motor 160 if the valve 118 is electrically energized to either position 164 or 166. The conveyor 26 operates in either the forward or reversed direction depending on whether the spool of the valve 118 is in position 164 or 166. The conveyor 26 stops when valve 118 is in its non-energized position 168. The hydraulic solenoid valves 116 and 118 are electrically interconnected with one another and with the transfer mechanism activating trip lever 76 and the bale receiving end trip lever 86 so that the spool of valve 116 will be moved from the non-energized position 148 to position 122 or 142 only when both the levers 76 and 86 have been displaced and so that, if the lever 76 is displaced while the lever 86 is not, the spool of valve 116 will remain in the non-energized position 148 while the spool of the valve 118 will switch position between positions 164 and 166 to change the direction of the conveyor 26 from forward to reverse.

The hydraulic system also has lines 170 and 172 in addition to line 126 by which fluid is provided to line 128 and valve 116 from line 124 regardless of the positions of valves 118 and 158.

The solenoid valves of the hydraulic system may be adapted for use with an automatic electrical control system for the overall operation of the bale wagon. Such a system is disclosed in the aforementioned related application of E. G. Wynn and C. L. Bryant entitled "Automatic Bale Wagon Control System". Each of the trip levers on the bale wagon in addition to the bale alignment mechanism actuating lever 86 may be adapted for use with a Hall effect sensor or other type electrical sensor or switch.

The formation of tie tier and the action of the tie spike mechanism therein involve the rearrangement of a pair of bales, initially disposed end to end in a row transversely along the forward end of the second table 28, into side rail positions in which the bales are separated from each other and respectively disposed longitudinally along opposite sides of the second table 28 adjacent the forward end thereof. The spikes 174 of the mechanism act to engage each of the respective bales to provide pivot points about which the bales will be rotated. The spikes 174 are positioned perpendicularly with respect to the surface of the second table 28 and below it. Upon activation of the tie spike mechanism, the spikes 174 rise through the openings 176 to engage the bales situated over the openings. In the event that either one or both of the bales in a row were short, the bales would be positioned as far as possible along the table 22 away from the bale receiving end in abutting relationship if an alignment device was not present. If the bales were short enough, the situation depicted in FIG. 9 would result in which the second bale has been placed too far to the left on the first table 22 to be able to be engaged by the right hand spike 174 when the bale is transferred to the second table 28. With an alignment device, however, the bales are placed in proper positions for engaging the spikes 174 as shown in FIG. 10 and the tie spike mechanism of the second table 28 can perform its function properly as shown in FIGS. 10–13.

In FIG. 11 the tie spike mechanism is activated by electrical means (not shown) which moves the spool of hydraulic solenoid valve 158 to position 180 so as to cause the hydraulic cylinder 160 to extend the spikes 174 upward to engage the bales on the second table 28. Simultaneously the tie forming trip lever 178 which normally rests out of the way is rotated into position on the first table 22 so as to lie in the path of the bales traveling longitudinally along the table 22. Also, the bale receiving end trip lever 86 is deactivated so that, even though not in contact with a bale, it will not prevent the first table transfer mechanism from engaging and will not reverse the conveyor 26. When hydraulic cylinder 160 has been extended completely, the solenoid valve 158 returns to its non-energized position so that fluid can flow to lines 126 and 128. The tie forming trip lever 178 is so positioned longitudinally on said table 22 that, when contacted and tripped by the leading edge of a bale, that bale will be longitudinally centered on the first table 22.

Immediately after the tie spike mechanism is activated, a bale is loaded onto the first table 22 and is conveyed along table 22 by the conveyor 26. Upon contacting the tie forming trip lever 178 the first table transfer mechanism, to which the trip lever 178 is connected, is activated and the single bale is delivered to the forward portion of the second table 28.

Since the two bales already positioned on the second table forward portion are, in effect, pivotally secured at their respective outer ends to the second table 28 by the spikes 174, delivery of the single bale to the center of the forward portion of the second table 28 pushes the respective inner ends of the two bales rearwardly and partially toward rail positions at the respective opposite sides of the second table 28, as seen in FIG. 12.

At the start of the next first table cycle, the spikes 174 and tie forming trip lever 178 still remain at their elevated positions and the right bale receiving end trip lever 86 remains deactivated. Again, the first table transfer mechanism activates upon receiving a single bale and pushes the bale onto the second table 28 and into the single bale already positioned there such that the latter single bale is moved rearwardly and the two partially pivoted bales are moved completely to their rail positions, as seen in FIG. 13.

After completion of this tie forming operation the hydraulic valve 158 is switched to position 182 and the spikes 174 and lowered and disengaged from their respective bales while the tie forming trip lever 178 is rotated to its deactivated position and the bale receiving end trip lever 86 is reactivated. When the hydraulic cylinder 160 is completely retracted, the valve 158 returns to its non-energized position. Finally the second table 28 is rotated about its pivot 32 to move the assembly of four bales to the rear thereof and the process is repeated.

While this invention has been described as having a preferred design, it will be understood that it is capable of further modification. This application, is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limites of the claims.

We claim:

1. An actuating device for the bale alignment mechanism of a bale wagon table, comprising:
   a lever positioned at the bale receiving end of the table and having a portion lying in the path of any bales of the table;
   said lever having means associated therewith for permitting said lever to be displaced from a rest position when contacted by a bale and for returning said lever to said rest position when the bale is removed;

an electrical sensor having a first position and a second position;

sensor actuating means for placing said sensor in said first position when said lever is displaced from said rest position and for placing said sensor in said second position when said lever is in said rest position, one of said sensor actuating means and said sensor being mounted in a fixed location adjacent said lever and the other of said sensor actuating means and said sensor being attached to said lever; and electrical means interconnecting said sensor with the table transfer mechanism for permitting operation of the transfer mechanism when said sensor is in said first position and for preventing operation of the transfer mechanism and reversing the table conveyor when said sensor is in said second position.

2. The actuating device of claim 1 wherein said sensor is mounted in a fixed location adjacent said lever and said sensor actuating means is attached to said lever.

3. The actuating device of claim 1 wherein said displacement and returning means includes a pivot mount for said lever positioned below the plane of the table, said lever pivoting in an arcuate path generally parallel to the longitudinal direction of the conveyor in a plane substantially perpendicular to the plane of the table.

4. The actuating device of claim 3 wherein said lever pivots away from the end of the table remote from the bale receiving end with said portion of said lever lying in the path of the bales moving to a position approximately within the plane of the table when said lever moves from said rest position to a displaced position.

5. The actuating device of claim 1 wherein said lever is so positioned at the bale receiving end of the table with said portion lying in the path of any bales on the table that said lever will be displaced away from the end of the table remote from the bale receiving end by a bale when received on the table from a bale loading mechanism and will be displaced away from the end of the table remote from the bale receiving end by a bale when being returned toward the bale receiving end of the table by the reversed conveyor of the table.

6. The actuating device of claim 3 wherein said lever is an elongated member curved in the plane substantially perpendicular to the plane of the table with a concave side facing toward the table and oriented such that when said lever is in said rest position said lever passes through the plane of the table at a point longitudinally spaced from a point on the plane of the table situated directly above said pivot mount.

7. The actuating device of claim 3 wherein said lever is an elongated member oriented at an angle with respect to the vertical and inclined away from the end of the table remote from the bale receiving end so that said lever passes through the plane of the table at a point longitudinally spaced from a point on the plane of the table situated directly above said pivot mount.

8. The actuating device of claim 1 wherein said electrical sensor is a Hall effect device and said actuating means is a magnet.

9. The actuating device of claim 1 wherein said displacement and returning means displaces and returns said lever through the same path regardless of the direction from which said lever is contacted.

10. The actuating device of claim 8 wherein:
said magnet is attached to said lever and lies adjacent said sensor when said lever is in said rest position and is removed from said sensor when said lever is in a displaced position; and
said displacement and returning means displaces and returns said magnet through the same path regardless of the direction from which said lever is contacted.

11. A bale alignment device for a bale wagon having a table for receiving a plurality of bales thereon in a row prior to transfer to a tier forming means and means for transferring bales from said table to said tier forming means, said bale alignment device, comprising:
means for conveying the bales along said table from a bale recieving end thereof;
means for determining when the first bale received on said table reaches a predetermined point remote from said bale receiving end;
means responsive to the overall length of the row of bales when the first bale reaches said predetermined point for reversing said conveying means to reposition the last bale on said table toward said bale receiving end when a short row is encountered;
said reversing means including a lever positioned at said bale receiving end, said lever having a portion lying in the path of any bales on said table;
said lever having means associated therewith for permitting said lever to be displaced from a rest position when contacted by a bale and for returning said lever to said rest position when the bale is removed;
said reversing means having an electrical sensor having a first position and a second position;
sensor actuating means for placing said sensor in said first position when said lever is displaced from said rest position and for placing said sensor in said second position when said lever is in said rest position, one of said sensor actuating means and said sensor being mounted in a fixed location adjacent said lever and the other of said sensor actuating means and said sensor being attached to said lever; and
electrical means interconnecting said sensor with said transfer means for permitting operation of said transfer means when said sensor is in said first position and for preventing operation of said transfer means and reversing said conveying means when said sensor is in said second position.

* * * * *